(12) United States Patent
Keller

(10) Patent No.: US 10,030,486 B1
(45) Date of Patent: Jul. 24, 2018

(54) METHOD FOR INSTALLATION OR REMOVAL OF FLEXIBLE LINERS FROM BOREHOLES

(71) Applicant: Carl E. Keller, Santa Fe, NM (US)

(72) Inventor: Carl E. Keller, Santa Fe, NM (US)

( * ) Notice: Subject to any disclaimer, the term of this patent is extended or adjusted under 35 U.S.C. 154(b) by 213 days.

(21) Appl. No.: 15/190,010

(22) Filed: Jun. 22, 2016

Related U.S. Application Data

(60) Provisional application No. 62/182,935, filed on Jun. 22, 2015.

(51) Int. Cl.
| | |
|---|---|
| *E21B 43/10* | (2006.01) |
| *E21B 23/01* | (2006.01) |
| *E21B 23/04* | (2006.01) |
| *F04B 43/12* | (2006.01) |

(52) U.S. Cl.
CPC ............ *E21B 43/103* (2013.01); *E21B 23/01* (2013.01); *E21B 23/04* (2013.01); *F04B 43/12* (2013.01)

(58) Field of Classification Search
CPC ....... E21B 43/108; E21B 43/103; E21B 29/10
USPC ............................ 405/150.1, 184.2; 166/207
See application file for complete search history.

(56) References Cited

U.S. PATENT DOCUMENTS

| | | | | | |
|---|---|---|---|---|---|
| 6,298,920 | B1* | 10/2001 | Keller | ..................... | E21B 19/00 166/377 |
| 7,841,405 | B2* | 11/2010 | Keller | ................... | E21B 49/084 166/207 |
| 8,176,977 | B2* | 5/2012 | Keller | ................... | E21B 43/103 166/207 |
| 8,424,377 | B2* | 4/2013 | Keller | ................... | E21B 47/042 73/152.28 |
| 9,534,477 | B2* | 1/2017 | Keller | ................... | E21B 43/103 |
| 9,797,227 | B2* | 10/2017 | Keller | ................... | E21B 43/103 |
| 2004/0065438 | A1* | 4/2004 | Keller | ..................... | E21B 47/10 166/250.03 |
| 2005/0172710 | A1* | 8/2005 | Keller | ..................... | E21B 47/10 73/152.41 |
| 2008/0142214 | A1* | 6/2008 | Keller | ..................... | E21B 43/08 166/250.01 |
| 2009/0003934 | A1* | 1/2009 | Keller | ..................... | E21B 49/08 405/150.1 |
| 2012/0141210 | A1* | 6/2012 | Kiest, Jr. | ................. | E02D 29/12 405/150.2 |

* cited by examiner

*Primary Examiner* — Kenneth L Thompson
(74) *Attorney, Agent, or Firm* — Rod D. Baker

(57) ABSTRACT

A system and method for performing a flexible liner eversion into, or an inversion out from, a low-permeability borehole. A flexible liner may be installed by eversion down a subterranean borehole in order to selectively seal the borehole. Such a liner may be removed from the borehole by inverting it up the borehole. Water is removed by pumping from the borehole beneath the lowest end of the borehole, to facilitate eversion of the liner. Water is added, by pumping water into the borehole beneath the lowest end of the liner, to permit or facilitate inversion of the liner.

19 Claims, 8 Drawing Sheets

METHOD FOR INSTALLATION OR REMOVAL OF FLEXIBLE LINERS FROM BOREHOLES

CROSS-REFERENCE TO RELATED APPLICATIONS

This application claims the benefit of U.S. Provisional Patent Application Ser. No. 62/182,935 entitled "Method for Removal of Flexible Liners From Boreholes," filed on 22 Jun. 2015, the entire disclosure of which is hereby incorporated by reference.

BACKGROUND OF THE INVENTION

Field of the Invention

This invention relates generally to using flexible liners for lining subterranean boreholes, and more specifically to a method for performing a flexible liner eversion into, or an inversion from, a low-permeability borehole.

Background Art

Flexible liners have been installed in pipes and subsurface boreholes by the process called eversion for more than twenty years. U.S. Pat. No. 7,896,578, for example, discloses an emplacement of a carbon felt by the process of flexible liner eversion. In known processes for liner eversion, if the bottom portion of a subsurface borehole is in a very low conductivity formation, a tube called a pump tube must be lowered into the borehole to remove the water from beneath the liner while the liner descends by eversion. Otherwise, the liner eversion stops short of the bottom of the borehole, as ambient water trapped in the borehole prevents complete eversion, because the everting liner cannot force the ambient water from the borehole into the surrounding geologic formation.

Liners installed by eversion are normally removed or withdrawn from a borehole by process of liner inversion, essentially the reverse of eversion. However, withdrawal by liner inversion can pose significant challenges, especially in boreholes whose surrounding geologic formation is of low conductivity.

After a liner has been everted into place (with the assistance of a pump tube), the pump tube can be removed to the surface by at least partially collapsing the liner, withdrawing the pump tube, and then re-inflating the liner with water or other fluids. However, once the pump tube has been removed, it is usually not possible to re-install the pump tube to add water beneath the liner, due to the extreme difficulty in inserting the pump tube between the liner and the borehole wall against which the liner is emplaced. The pump tube cannot be re-inserted in the borehole between the liner and the borehole wall due to, among other things, friction and breakouts in the borehole wall acting to block the tube's descent.

If it is attempted to invert the liner from a borehole in a geologic formation with little conductivity, the liner cannot be inverted without pulling a partial vacuum beneath the liner (between the bottom of the liner and the bottom of the borehole) as it inverts. The resulting tension on the liner to effect the inversion is usually greater than the system can withstand and the liner will be torn apart. The basic problem is that the low conductivity formation does not allow water to flow back from the formation and into the borehole beneath the inverting liner. Devices such as lay-flat hoses have been emplaced in a borehole to allow water addition beneath the everted end of a liner to aid the liner's inversion, but if the flat hose is kinked, as often occurs, the inversion fails (e.g., when water cannot be pumped down the tube). Also, a lay-flat hose may compromise the sealing of the borehole by the liner, and the water addition via a hose can cause a buckling of the liner.

Previously, the sole recourse for withdrawal of flexible liners in such a situation has been to remove nearly all the water from inside the liner, and then drag the deflated liner out of the borehole. Such procedure invariably abrades the liner, ruining the liner by causing many leaks in the liner coating. The described inability to invert a flexible liner to with draw it from a low-conductivity borehole has been a problem throughout the history of use of such liners. If the conductivity is not zero, but small, several days are often required to invert a liner from a borehole. This problem is aggravated by the fact that a liner can be installed into an impermeable portion of the borehole relatively easily, so the difficulty of removal is a common experience.

A major advantage of the present invention is to allow a liner to be everted to the bottom of the borehole in a formation of low permeability without the need to use a pump tube to remove the water from beneath the everting liner and to also allow the additional advantage of removal of the liner by inversion without the need for water to flow from the formation into the borehole beneath the inverting liner. Thus, the apparatus and method of the present disclosure eliminate the need for a pump tube to add water beneath a liner during liner withdrawal from a low-conductivity borehole.

SUMMARY OF THE INVENTION

There is initially disclosed hereby a method and apparatus for introducing water to, and removing water from, a borehole beneath a liner as it is being inverted from or everted into a borehole, and yet without buckling of the liner. By "beneath a liner" we mean below the everting/inverting end of a flexible liner, that is, between the lowest (elevation in the borehole) end of the liner and the bottom of the borehole. The technique and system are especially useful in facilitating the inversion of flexible liners from boreholes with very low conductivity, which do not allow water to flow reasonably quickly from low-conductivity geologic media into the borehole beneath the inverting liner. The method and system include the extension of a vent tube to the surface in association with the supporting tether used for liner emplacement. (The tether is a cord or cable extending from the bottom of the liner to the surface above the borehole.) The normal vent tube used is short, and usually is equipped with check valves to prevent the liner water fill from flowing out of the liner. The vent tube allows the venting of air trapped in the closed end of the liner, thus substantially preventing the development of an air filled "balloon," which can prevent liner installation by eversion.

By extending the vent tube to the surface, but without any check valves in the tube, water can be added to the interior of the closed end of the liner, and the long vent tube still provides the venting of trapped air. By maintaining sufficient tension on the tether, the pressure beneath the liner (i.e., between the closed, lowest, end of the liner and the bottom of the borehole) is less than the water pressure inside the liner. Under those circumstances, the water added via the vent tube dilates (radially outward) the inverted bottom end of the liner, and the water flows downward through the inverted bottom end of the liner. As the water is added to the borehole volume beneath the liner, the low pressure normally developed beneath the inverting liner is raised and the liner can be inverted from the borehole without imposing excessive tension on the liner (via the tether). This method of adding water to the borehole space beneath the liner, and the apparatus for continuing water addition as the liner is inverted, are beneficial features of the presently disclosed invention.

A further advantage is realized using the long vent tube if water can be withdrawn from the borehole beneath the liner as the liner is installed by eversion to the bottom of the borehole. By adding a flexible permeable feature below the bottom end of the long vent tube, outside of the liner, water can be withdrawn from beneath the borehole as the liner is everting into a formation of relatively low permeability. This eliminates the need for the pump tube and the associated deflation of the liner to remove the pump tube. Field tests of the method and apparatus have been successful.

BRIEF DESCRIPTION OF THE DRAWINGS

The accompanying drawings, which are incorporated into and form a part of the specification, illustrate embodiments of the present invention and, together with the description, serve to explain the principles of the invention. The drawings are only for the purpose of illustrating preferred embodiments of the invention, and are not to be construed as limiting the invention. Further, various elements depicted in the various views are not necessarily to scale relative to one another. In the drawings.

DESCRIPTION OF PREFERRED EMBODIMENTS

There is disclosed a method and apparatus for withdrawing by inversion a flexible liner previously installed into a borehole, such as a subterranean borehole; the method and apparatus are especially useful in allowing the inversion of flexible liners from boreholes in subsurface geologies with very low conductivity, which do not allow water to flow into the borehole beneath the inverting liner. The method and apparatus also are useful in the installation of an everting of a flexible liner into a borehole.

Figure 1:
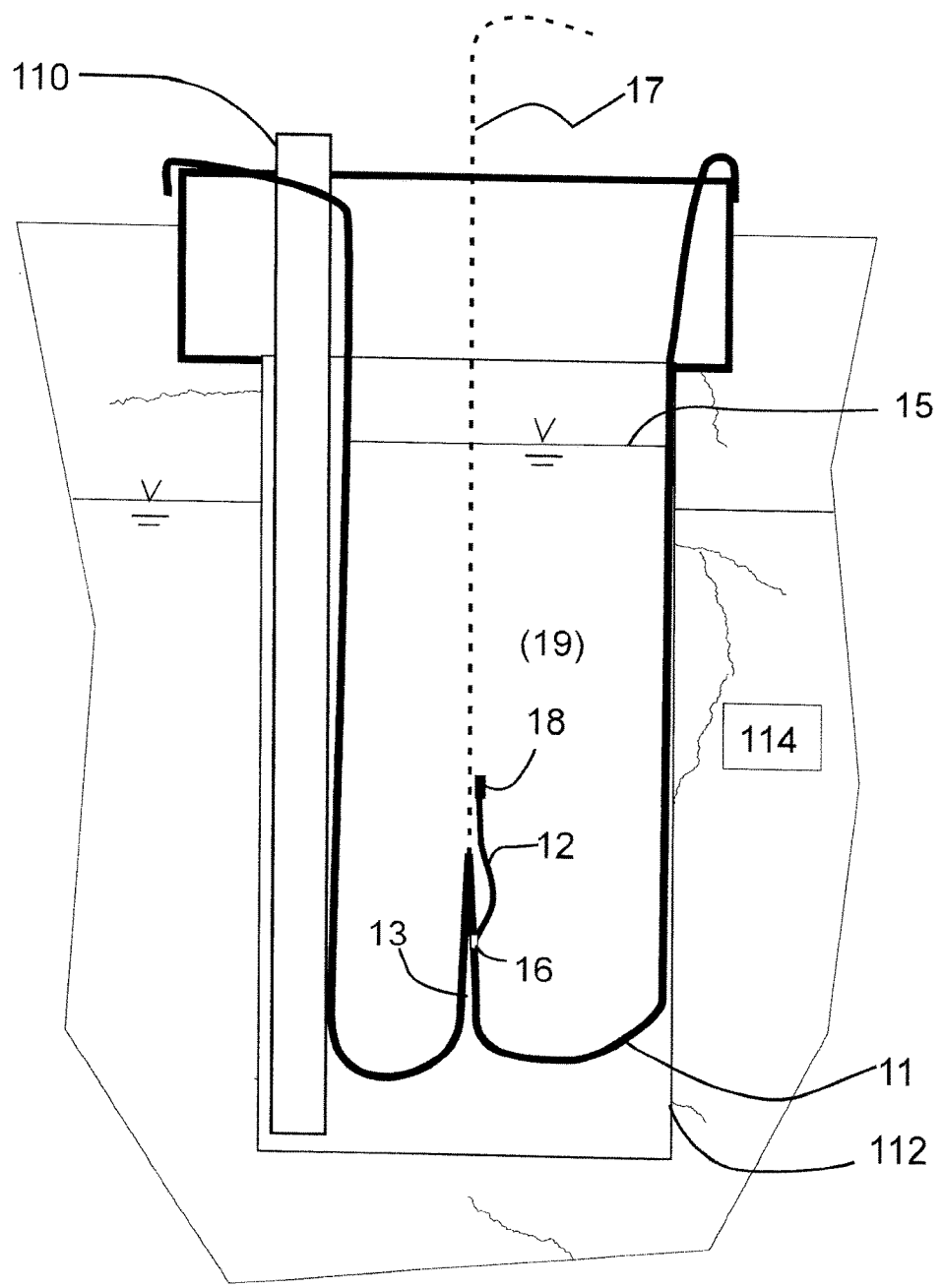
FIG. 1 is a side sectional view of a known flexible liner system in a borehole, illustrating a vent tube design with a check valve in place, with the inverted liner dilated by the water pressure and a pump tube for removal of water beneath the everting liner.

Attention is invited to FIG. 1, which illustrates a method known in the art for the conventional installation of a flexible liner 11 into a borehole 112. The prior art method requires a vent tube 12 in the closed end of the liner 11 (the lower closed end which everts during liner installation). The vent tube 12 allows air entrapped exterior to the liner, but within the inverted liner pocket 13 defined at the outside of the closed end of the liner, to escape as the closed end of the liner 11 descends beneath the water level 15 within the liner. Otherwise, the air thus entrapped within the outside pocket 13 can and often does dilate the liner 11 (particularly at its closed everting end) until the descent of the liner 11 (below the water surface 15 in the liner) is substantially impeded. Known liner installation techniques are generally described in my U.S. Pat. Nos. 7,281,422 and 7,896,578.

Continued reference is made to FIG. 1, depicting the ordinary geometry of the air vent system featuring long vent tube 12. The tether 17 is a cord or cable attached to the closed end of the liner 11, and may be used to raise or lower the closed end of the liner to invert the liner and/or control its eversion. A port 16 is defined in the closed end of the liner 11, and is connected to a vent tube 12. The tube 12 is attached to the tether 17 so as to run upward along a segment of the tether 17, usually for a relatively short distance of about ten feet or less. The vent tube 12 is fitted with at least one check valve 18 to prevent water in the interior 19 of the liner 11 from flowing back down through the vent tube 12 and out the port 16 (thereby causing the liner 11 to deflate and to lose the water level 15 necessary for internal liner pressure to seal the liner against the borehole wall.

As seen in FIG. 1, a pump tube 110 is often placed in the borehole 112 prior to the installation of the liner 11 by eversion. Without the pump tube 110, the everting liner 11 to advance down the hole must drive the water 113 in the borehole (beneath the everting end of the liner) into the surrounding geologic formation 114. Because the formation 114 may be of low hydraulic conductivity, the liner 11 descent can be slowed or stopped by water 113 trapped in the borehole space beneath the descending liner 11. The pump tube 110 allows the water 113 beneath the liner 11 to be removed, aiding the eversion of the liner 11 to the bottom of the borehole 112. However, the liner 11 is intended to seal the borehole 112, and so the pump tube 110 must thereafter be removed because it prevents a reliable seal of the liner 11 against the borehole 112 wall.

Removal of the pump tube 110 normally is done by removing some of the water from the interior 19 of the liner 11, causing it to partially collapse. The partially collapsed liner releases the pump tube from being "clamped" between the liner and the borehole wall. After the pump tube 110 has been withdrawn out of the borehole 112, water can again be added to the liner interior 19, causing the liner 11 to re-inflate, and thereby seal against the full circumference of the wall of the borehole 112. With the liner in its inflated and dilated state, sealed against the borehole wall, it thereafter is difficult to impossible to invert the liner 11 out of the borehole 112;

such removal by inversion requires that water flow from the geologic formation 114 into the borehole 112 as the liner 11 is inverted upwards in the borehole 112. If the formation permeability is too low to allow the water to flow into the borehole beneath the inverting liner, the liner cannot be removed by inversion. The most common solution currently employed is to remove nearly all the water from within the interior 19 of the liner 11, and then to pull the liner out of the borehole 112 (e.g., with the tether 17). Doing so, however, frequently damages the liner 11 and prevents its reuse.

Figure 2:
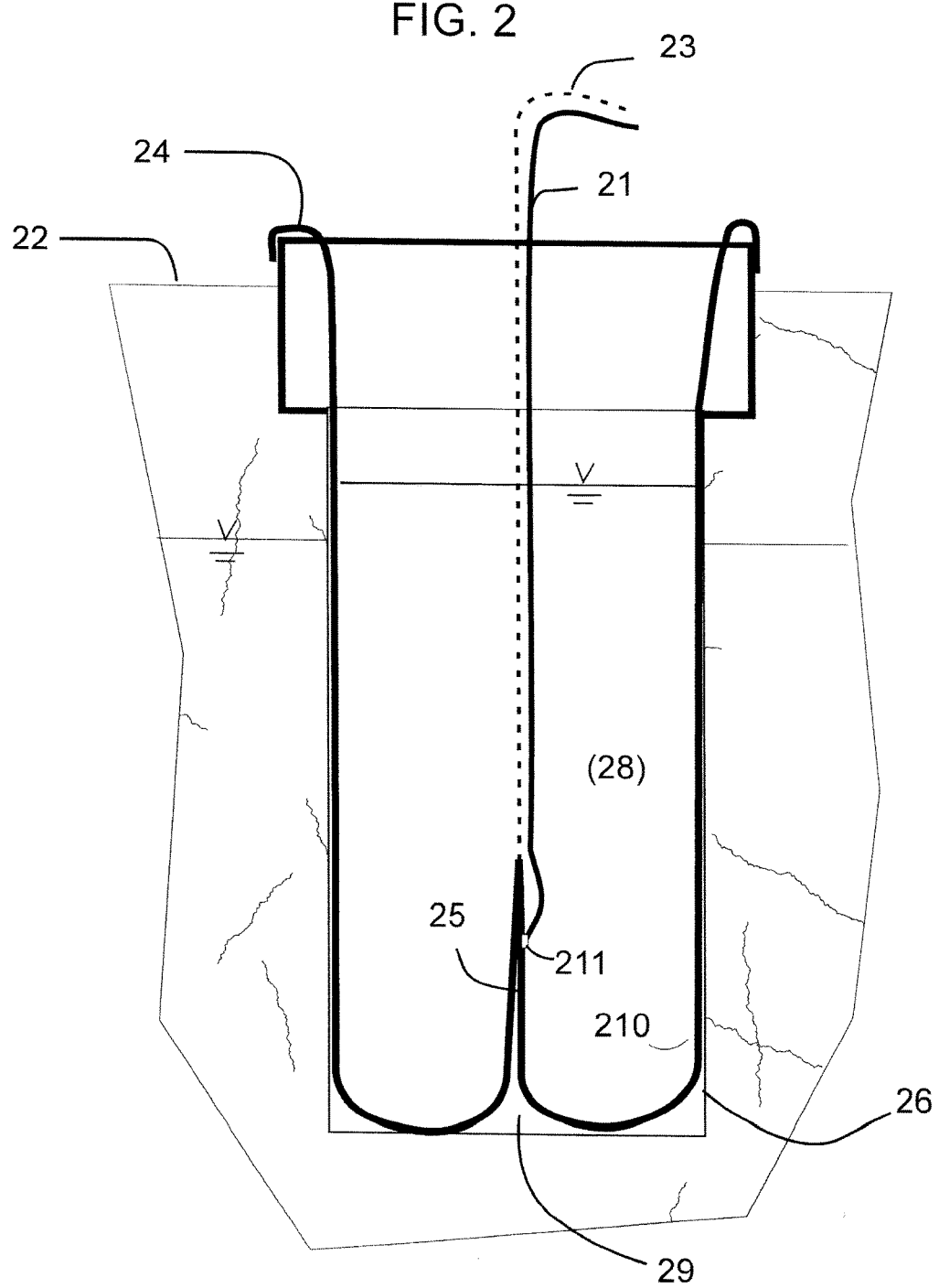
FIG. 2 is a side sectional view of a system according to the present invention, illustrating the presence of a vent tube extending to the surface and with the pump tube removed.

Attention is invited to FIG. 2. An aspect of the presently disclosed innovative system and method is the extension of the vent tube 21 from the closed end of the liner, upwardly in the liner interior, all the way to above the ground's surface 22. The vent tube 21 preferably is attached at least intermittently to the tether 23 for support. Such a vent tube configuration eliminates the need for a check valve (i.e., valve 18 in FIG. 1) for an air vent of the inverted liner 24, and also allows water to be added, via port 211 to the exterior of the liner at the inverted portion 25 of the liner 24. (It is noted that the inverted portion 25 of the liner, adjacent the closed end, defines a void or pocket between liner walls, but that such void or pocket is topologically outside the liner; the inside or main interior 28 of the liner is substantially full of water as indicated in FIG. 2.) As a liner 24 is everted down a borehole, the inverted portion 25 thereof decreases in axial extent; conversely, as a liner is withdrawing up a borehole by inversion, the axial length of the inverted portion increases until the liner emerges from the borehole at the surface 22. In FIG. 2, the liner is fully everted to the bottom of the borehole, so the inverted portion 25 of the liner is of relatively modest axial extent. Functional advantages of this system configuration will be described further hereafter. The present invention thus overcomes the known problem of water addition through the same pump tube (tube 110 in FIG. 1), wherein it normally is impossible to re-install such pump tube 110 back down into the borehole 26 (e.g., due to the presence of the inflated liner 24, and of disruptive fractures and breakouts in the borehole wall).

There thus is provided hereby a means and method for adding water to the borehole 26 at a lower location beneath the closed end of the liner 24; such provision of water outside and below the liner allows an installed liner to be inverted to the surface 22. The liner 24 may be withdrawn (using the tether 23) upwardly in the borehole 26, toward or to the surface 22. The controlled addition of water below the rising inversion point (i.e., at inverted closed end 25) of the liner reduces or prevents the liner from "pulling" a vacuum in the borehole volume below the liner (between its inversion point and the bottom 29 of the borehole). This is a significant advantage of the present system and method, because the bottom portions of the borehole 26 often exhibit low hydraulic conductivity, which impairs severely the water flow from the surrounding formation into the borehole 26 near its bottom 29. Use of the disclosed system and method thus minimizes damage of the liner during withdrawal from the borehole, permitting its reuse if desired.

It is an unexpected benefit that water can be added through the vent tube 21, through the port 211, and into the borehole space below the inverting end of the liner, because the exterior pocket at the inverted portion 25 of the liner is believed normally to be firmly collapsed by the water pressure in the interior 28 of the liner 24. Previous to the present invention, it was commonly assumed that supplying water to the exterior of the closed end 25 of the liner 24 would form a large water filled bladder (due to the pocket that generally exists at the closed end 25, as seen in FIG. 2), which bladder would press against the everted portion of the liner 210, and against the borehole 26 wall. Such a water-inflated bladder, it formerly was supposed, would tend to expand radially outward through the liner interior 28 and press firmly against a lower portion of the everted liner (against the borehole wall), thus preventing the liner 24 from inverting with tension on the tether 23 to rise upward in the borehole. Such has been determined not to be the usual case, and the present system exploits this discovery.

Figure 3:
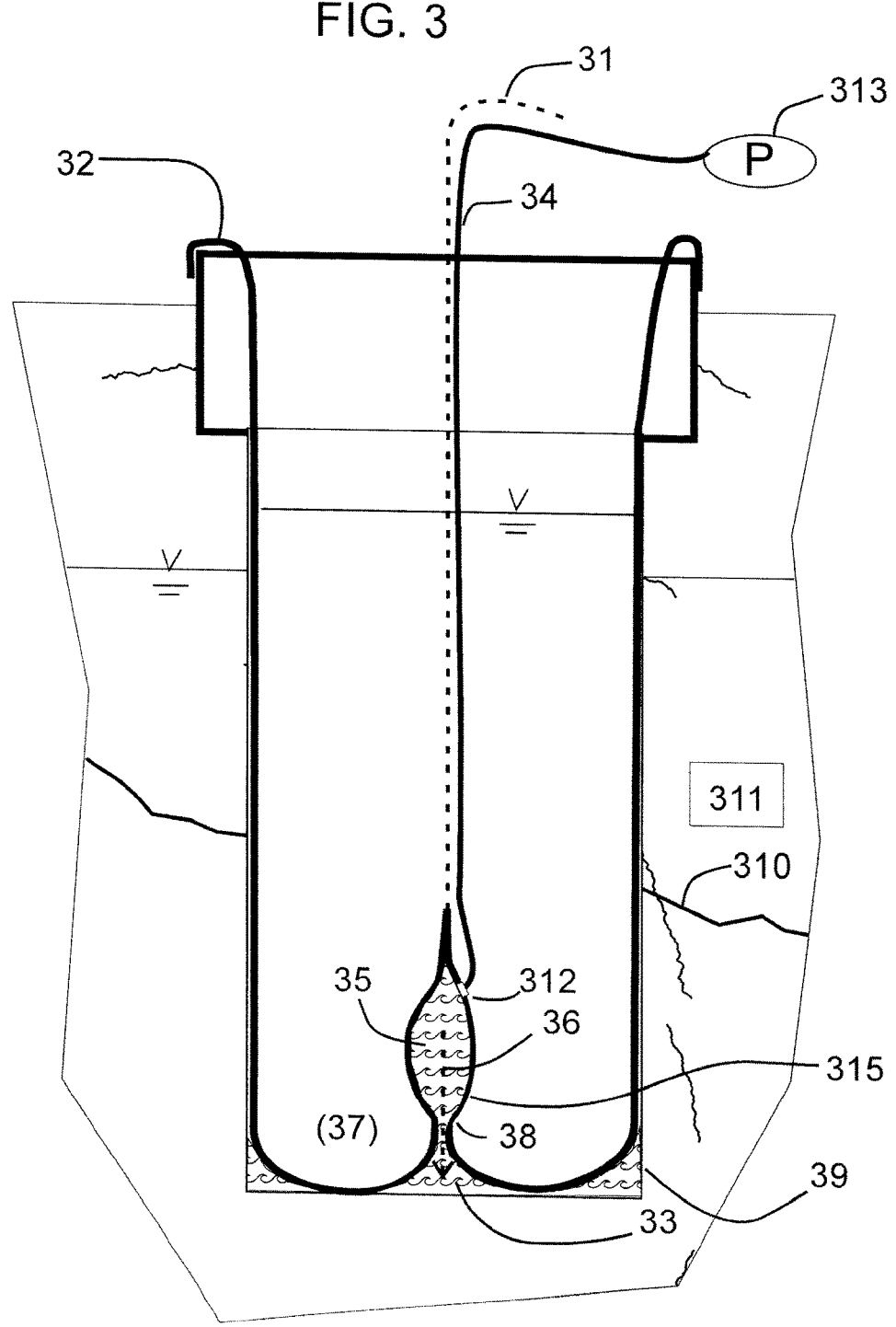
FIG. 3 is a side sectional view of a system according to the present invention, illustrating the addition of water to dilate the inverted portion of the inverting liner and to supply water beneath the liner.

FIG. 3 illustrates the actual water flow regime under the inventive procedures of the present disclosure. FIG. 3 depicts a fully everted liner 32 whose closed end is at or near the bottom of a borehole 39 in formation 311. It is desired to remove and extract the liner from the borehole by pulling on the tether 31 to invert the liner up the borehole. According to the process, when tension is applied to the tether 31 (i.e., to invert the liner to withdraw the liner from the borehole 39), a low pressure is developed in the borehole volume 33 beneath the inverted end of the liner 32. The low pressure in this volume 33 usually prevents the liner 32 from inverting. Water is pumped with a pump 313, via the long vent tube 34, to the port 312 in the inverted end 315 of the liner. Water flows out the port 312 and into the small pocket or void 35 defined by the inverted end 315 of the liner, thus inflating the inverted end as seen in FIG. 3.

However, because the everted liner 32 contains wrinkles, there is a small flow path 36 (directional arrow in FIG. 3) available inside the inverted end 315 of the liner. The flow path 36 provides fluid communication from the void 35 to the low pressure volume 33 beneath the bottom of the liner, with the result that the water added (via the port 312) to the void 35 in the inverted end 315 flows down toward the liner's point of inversion 38. The added water within void 35 is in pressure equilibrium with the water 37 within the interior of the everted liner 32, except that the comparatively lower pressure in the borehole volume 33 generates a pressure gradient in the interior wrinkles of the inverted end 315 (e.g., decreasing pressure along the flow path 36 from the void 35 and toward the borehole volume 33, past the point of eversion 38). The downward gradient toward the borehole volume 33 beneath the liner 32 (and outside the void 35) causes the water added via port 312 to flow downward out of the void 35, dilating the liner at and around the point of inversion 38, and thereby opening even more open vertical flow path. Thereby the water injected via the tube 34 propagates toward and past the inverted bottom end 315 of the liner until it reaches the point of inversion 38 at the very bottom of the liner 32. At or about the point of inversion 38, the low pressure in the volume 33 beneath the liner causes the liner 32 to fully dilate, which constricts the aperture found at the inversion point between the void 35 and the volume 33. Such dilation and constriction would normally seal closed the bottom end of the inverted liner 32; it has been determined, however, that the existing wrinkles in the liner along the flow path 36 allow flow from the void 35 into the borehole volume 33 beneath the liner 32. This flow of added water is sufficient to permit the liner 32 to be further inverted from the borehole 39 by tether 31 tension. Adding the water to the volume 33 beneath the liner ameliorates or prevents the creation of such a low pressure in the volume as to prevent the liner from being inverted up the borehole.

The tension in the tether 31 nevertheless preferably is regulated to maintain a relatively low fluid pressure in the borehole volume 33 beneath the liner. If a low pressure (relative to the pressure within the liner interior 37) is not maintained in the volume 33, the water added to the void 35 (via the pump 313 and tube 34) may cause the pressure in the borehole and beneath the liner 32 to equilibrate with the pressure within the interior 37 of the everted portion of the liner 32. The loss of that pressure differential between the inside 37 of the liner and the open borehole volume 33 beneath the liner may permit the liner 32 to collapse undesirably and to buckle, instead of inverting. Such collapse and buckling of the liner 32 can cause the liner to become firmly jammed in the borehole 39, preventing liner 32 removal. Therefore, it is advised in accordance with the method that the tether 31 tension is monitored by any suitable method, and carefully controlled to maintain a low pressure in the borehole volume 33 (beneath the liner's rising point of inversion 38) relative to the pressure monitored within the liner interior 37. As long as such differential pressure is maintained, by tension applied through the tether 31, the constricted aperture at the point of inversion 38 at the bottom end of the inverted liner 315 constrains the flow of the added water from the void 35 into the borehole 39.

As the liner 32 is inverted during the controlled pumping of injected water into the vent tube 34, the everted portion of the liner 32 can continue inverting. Inversion continues (the point of eversion moves upward in the borehole) to withdraw the liner 32 up the borehole, until the sealing liner 32 is removed from, and thus uncovers, a flowing fracture 310 in the formation 311. At that time, the water inflow from the formation 311 will increase the pressure beneath the liner 32, thus to slow the flow of the injected water along the flow path 36. It is preferable that, when significant inflow from a fracture 310 is realized, water injection through the tube 34 then be stopped, but the tension on the tether 31 be maintained, to prevent a buckling of the liner 32. Because the first-encountered ambient water-bearing formation fracture 310 is seldom a high-volume water discharge path, the water added by injection from the pump 313 can be safely terminated or slowed to prevent the loss of the low pressure in the borehole volume 33 beneath the liner. A reliable indication that water addition is no longer needed is an increase in the rate of liner inversion and a reduction in the tension on the tether.

It is known by those in the art that the differential pressure beneath an inverting liner is calculated by:

$$\Delta P = 2(T-D)/A - P\text{min},$$

where T is the tension on the tether, Pmin is the minimum eversion pressure for (inside) the liner, D is the drag of the tether and liner in the borehole, and A is the cross sectional area of the borehole. For very stiff liner fabrics, Pmin is relatively large, and must be well overcome by the tether tension to prevent liner buckling. The drag is usually not significant for a tether and vent tube in the borehole. However, for slender boreholes (e.g., less than about four inches diameter), or boreholes which are not vertical, this drag can be significant.

Figure 4:
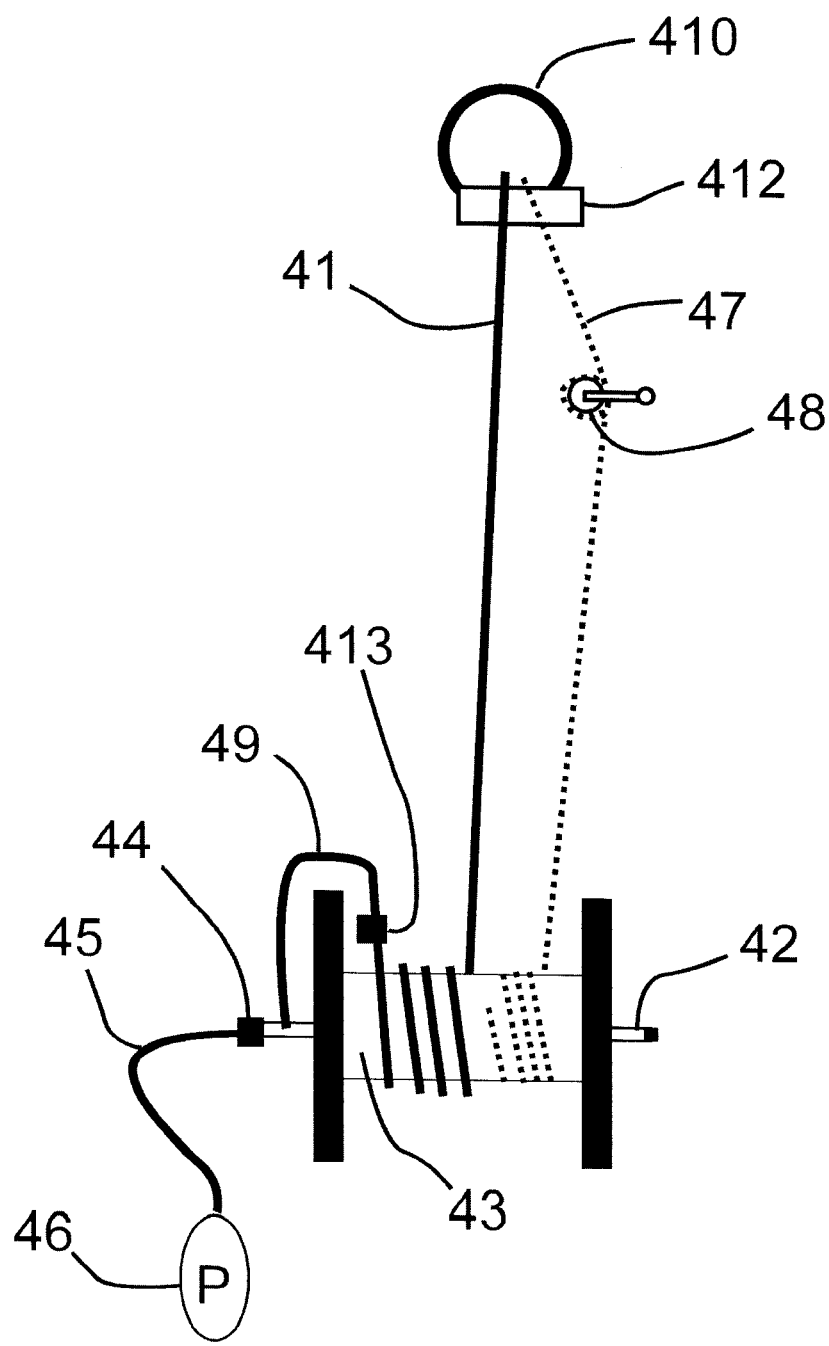
FIG. 4 is a diagrammatic top or plan view of a system and apparatus, according the present invention, for supporting a reel containing the tube, tether and liner and which allows water addition as the liner is being inverted from the borehole.

Adding water to the vent tube 34 while the liner is being inverted from the borehole is awkward while tension is being applied to the tether 31 by a winch at the surface. The long vent tube 34 normally cannot be wrapped on the tether's take-up winch, and therefore must be separated from the tether as the liner rises from the borehole. An optional but desirable reel assembly is illustrated schematically in FIG. 4 for accumulating the tube 41 at the ground's surface as the tube emerges from the top of the borehole 410. (The liner being extracted by inversion is omitted from FIG. 4 for the sake of clarity of illustration.) Referring to FIG. 4, which is a top plan view of the system, a winch 48 operably engaged with the tether 47 is used to pull the liner and vent tube 41 from the borehole. As the vent tube 41 is withdrawn from the borehole 410, it is separated from the tether 47, passed over a roller 412, and directed to a larger simple main reel 43 on a reel stand at the surface. Pumping water down the vent tube 41, as it is being withdrawn and as the main reel 43 rotates, however, requires a special reel design.

Accordingly, there is provided a reel 43 having a hollow axle 42 through which water may flow. The open upper end of the vent tube 41 is in fluid communication with the reel's hollow axle 42 via a coupling 413 and auxiliary tube 49, which coupling and tube rotate with the reel 43 and axle 42. Water thus may flow, via the axle 42, between the inlet end swivel connection 44 and the coupling 413. As the tube 41 is being wound onto the main reel 43, water is injected into the inlet end 44 of the hollow axle 42 through a swivel connection 44 of known configuration. The inlet connection 44 is in fluid communication, using a water pump 46, with a delivery tube 45. Because the axle 42 rotates with the reel 43, the vent tubing 41 can be wound upon the reel 43 while water nevertheless continues to be added to the vent tube 41 via the auxiliary tube 49, which is connected to the interior of the hollow axle 42.

It is also convenient to wrap the tether 47 as it comes off the winch 48 onto the same main reel 43. Otherwise, there is a great tangle of tether 47 and tubing 41 accumulating at the surface. When the closed end of the inverted liner arrives at the surface, there is no longer a need to add water to the borehole 410 beneath the liner. In the normal liner removal, water addition can be halted after the first significant water-flowing formation fracture has been uncovered by the liner inversion. The liner may then be pulled from the borehole using any of a number of known methods and attachments. The liner may also be accumulated on the same reel 43 wrapped over the tubing 41 and tether 47. It is noteworthy that the inversion of a liner from beneath that deepest significant fracture allowing subsurface flow into the borehole may take many hours, even if the necessary inversion is only one foot distance. In many situations, the inversion of a liner to the surface, without damaging the liner, is practically impossible without the forgoing apparatus and techniques. For very deep water tables, it may be difficult to control the water addition with a continuous operation of the pump 313. A more cautious procedure is to add water to the volume 35 in controlled increments and to allow the liner to invert a short distance with each addition before adding more water.

It is also possible, if desired, to use the foregoing described hollow axle reel 43 assembly to facilitate everting the liner down the borehole, by essentially reversing the process. The tether 47 is paid out from the reel 43 as the liner and vent tube 41 also are controllably unwound from the rotating reel and disposed down-hole; meantime, water is pumped by the pump 46, as needed, from the borehole beneath the eversion point of the liner via the vent tube 41, and thence via the coupling 413 and auxiliary tube 49, rotating hollow axle 42, and swivel connector 44. However, such water removal from the borehole beneath the liner requires another feature described hereafter. The hollow-axle reel assembly and associated tubing also can be used to draw trapped air, from the closed end of the liner, through the same vent tube and hollow axle assembly while the liner is being installed by eversion down-hole. This technique prevents even the temporary formation of an air balloon as occurs with the short valved vent tube. The water injection procedure according to this disclosure, however, significantly and especially facilitates water addition during liner inversion back up the borehole.

There has been disclosed, therefore, a system and method for performing a flexible liner inversion from a borehole in a subterranean geologic formation of low hydraulic conductivity. A tether is provided for withdrawing from the borehole a flexible liner that previously has been installed (i.e., by eversion) down the hole; the tether is connected to the closed end of the installed liner. The system includes a continuous vent tube connected to the interior of the inverted liner and extending along most or all the length of the tether, and the liner removal procedure with tether tension and associated water addition beneficially permits the removal of the flexible liner by inversion from the low-conductivity borehole. It is convenient that the same tube for water addition also may be used for air removal from the liner during liner installation by eversion. The system and method allow the pump tube to be removed after the liner installation, to preserve the sealing characteristic of the flexible liner.

It is contemplated that the invention may be practiced at any liner-sealed borehole location which otherwise requires the pump tube removal, and for which the liner is preferred to be removed by inversion instead of being dragged from the borehole after removing the eversion water from the liner interior. The presently disclosed methodology results in a large labor savings. Notably, in previously known systems, the entrapment of a flexible liner in a low permeability formation has resulted in liner removals requiring a period of several days, Also noteworthy is that the presently disclosed method may be advantageously applied to techniques such as those of U.S. Pat. No. 7,896,578 ("Mapping of Contaminants in Geologic Formations"), which techniques benefit from the absence of a pump tube (to pump water into the borehole volume below the inverted end of the liner). The elimination of a pump tube prevents flow that otherwise would occur in the borehole adjacent to the pump tube (and outside the liner), thus compromising the adsorption in the carbon felt. The methods of U.S. Pat. No. 7,896,578 also benefit substantially from the inversion of the liner from the borehole, because a liner free of leaks often is needed to re-seal the borehole after the removal of the cover employed in that procedure.

There also is disclosed a method using the same long vent tube design of FIG. 2, which is modified, to allow a liner to be everted down a borehole into a formation of low conductivity or permeability, but without the use of the pump tube (e.g., tube 110 in FIG. 1). Ordinarily, if an attempt is made to remove water from beneath the everting liner (in a borehole extending through relatively impermeable strata) by pumping water from the long vent tube (such as tube 21 seen in FIG. 2), the water removal and associated reduction of the pressure in the long vent tube causes the inverted portion of the liner to collapse more tightly. This collapsing effect is due to the water pressure outside the inverted end portion of the liner (i.e., pressure inside the liner but surrounding the liner inverted portion 25 in FIG. 2). This effect is the opposite of the dilation of the liner as discussed hereinabove with reference to FIG. 3, and can impede or prevent the flow of water from beneath the everting liner toward a port such as port 211 in FIG. 2.

Figure 5:
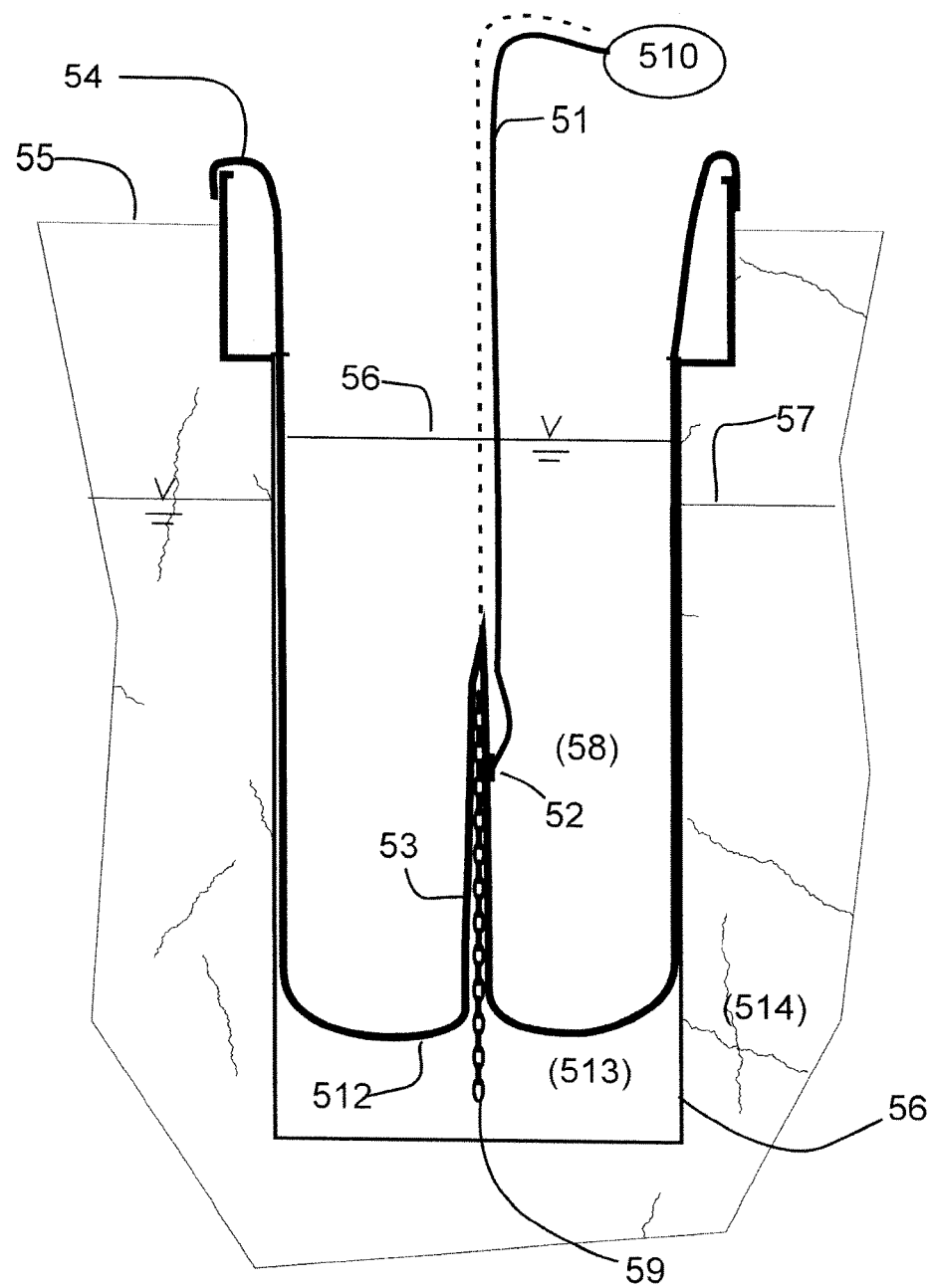
FIG. 5 is a side sectional view similar to FIG. 2, depicting the addition to the system of a permeable flexible conduit which allows water removal from beneath the everting liner during liner installation.

Such collapse normally could prevent the removal of water from beneath the descending, everting, liner using a long vent tube. (Such water removal is usually the purpose of the pump tube, such as tubes 110 and 34 seen in FIG. 1.) Reference to FIG. 5, however, illustrates that by providing a suitable flexible conduit 59, descending beneath the port 52 and extending though the interior of the inverted portion of liner 53, water 513 can be withdrawn from the volume space beneath the liner 54 as the liner is being everted down the borehole 50. The conduit 59 in effect "holds open" the pocket or void outside the liner defined by the inverted portion 53 thereof, so that water can flow upward through that void as the liner undergoes eversion. As the liner 54 is everting, the flexible conduit 59 constantly extends beyond the liner's eversion point 512 and toward the bottom of the borehole 50. The flexible conduit 59 thus allows water 513 beneath the everting bottom 512 of the liner 54 to flow upward, within the void outside of, and defined by, the walls of the inverted portion 53 of the liner, to the port 52. The port 52, through the liner and near the liner's closed end, permits water to be pumped from the pocket defined by the inverted portion 53 of the liner and into the long vent tube 51, and thus from beneath the descending liner. Such water removal can be effected easily with a pump 510, such as a peristaltic pump at the surface 55, and optionally but preferably through a hollow axle assembly and methodology similar to those disclosed hereinabove with reference to FIG. 4.

Water removal with a peristaltic pump requires that the water level 56 in the liner 54 be less than approximately twenty-five feet below the level 55 of the peristaltic pump. This constraint prevents a vacuum from forming in the long vent tube 51 and the associated cavitation which would inhibit water flow in the system. Because the liner water level 56 can be a substantial height distance above the water level 57 in the formation 514, the hydraulic head beneath the everting liner is typically increased substantially above the water table 57 in the formation. This is especially probable if the formation 514 below the everting liner is of relatively low permeability. In such a situation, the ability to remove water 513 from beneath the descending liner's eversion point 512 is most useful. If there are sufficient permeable geologic features (fractures or relatively permeable strata) intersecting the borehole 50, the length of the flexible conduit 59 need not be any longer than the depth of the borehole 50 below the last sufficiently permeable feature. Upon passing that permeable feature, the liner 54 seals that flow path, and it is essential that water 513 thereafter can be removed from beneath the liner to permit further descent of the everting liner.

Figure 6:
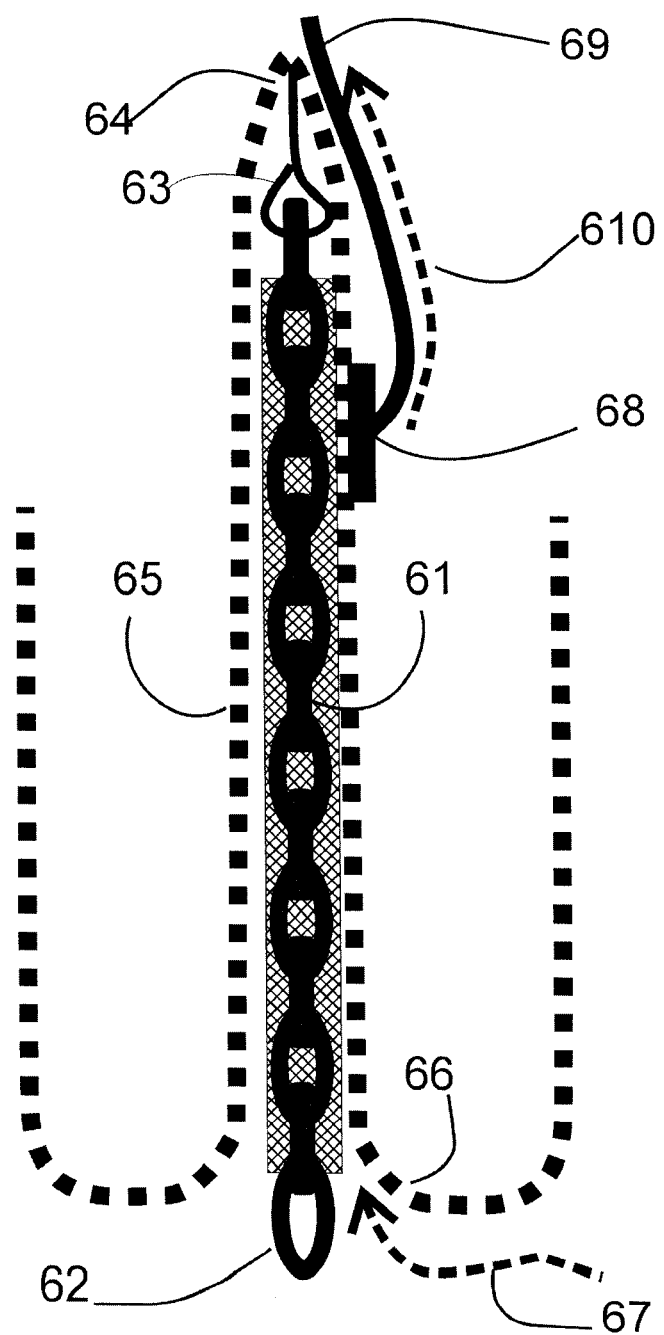
FIG. 6 is an enlarged vertical section view of selected features seen in FIG. 5, illustrating details of the permeable flexible conduit, effectively an extension of the long vent tube.

FIG. 6 shows the details of the flexible conduit seen in FIG. 5. In a preferred but optional practice, the flexible conduit 61 is formed of a supported heavy chain 62 covered with a permeable and flexible tubular mesh. The chain 62 is supported at its top end with a short connector tether 63 extending from the closed end 64 of the liner 66, thereby connecting the chain to the closed end of the liner. The conduit 61 is enclosed within the inverted portion 65 of the liner 66. The practice of the method thus includes extending the bottom end of the flexible conduit into the borehole beneath the inverted portion. As the liner 66 is everting, the chain 62 is extended from the everting liner (FIG. 5), thereby maintaining an open flow path 67 from the space beneath the bottom, everting portion, of the liner to the port 68, thereafter to flow 610 through the long vent tube 69, and then to the pump at the surface.

Figure 7:
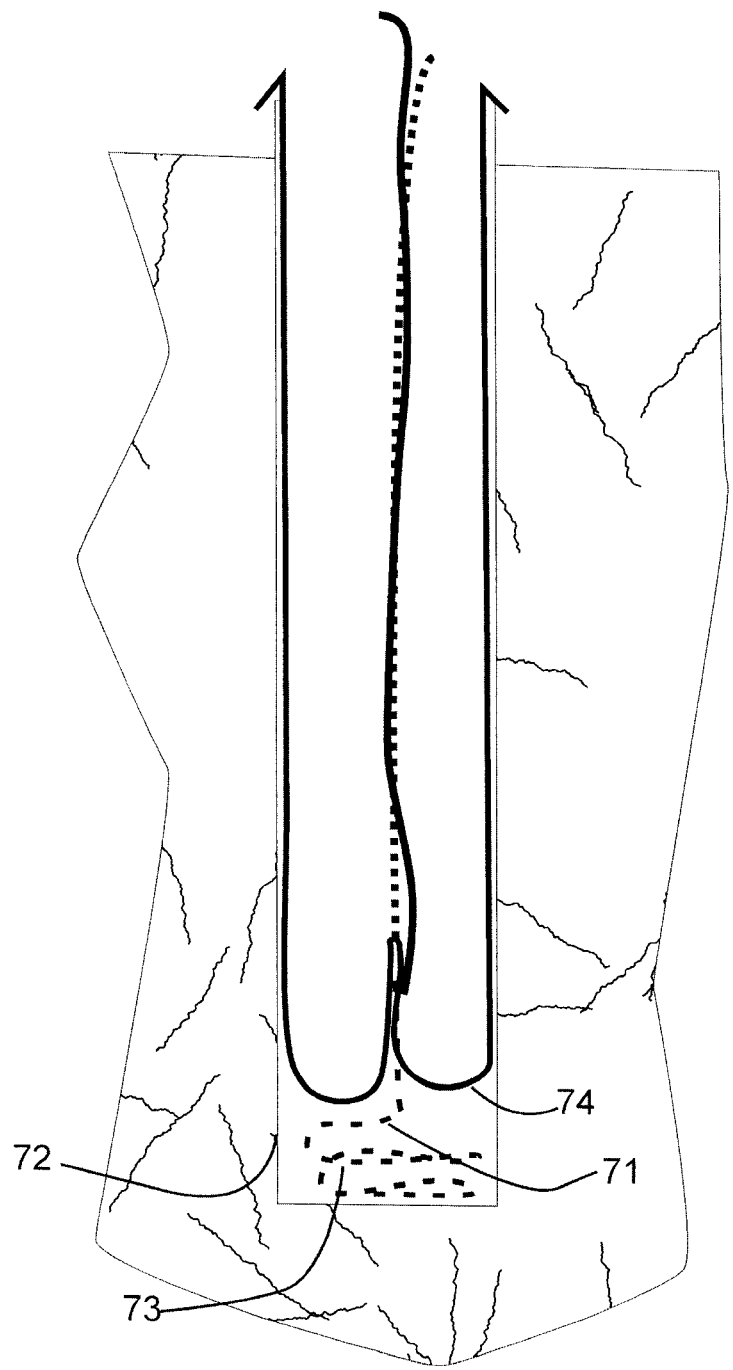
FIG. 7 is a side sectional view similar in context to FIG. 5, showing a permeable conduit accumulating in the bottom of the borehole during liner eversion.

When a conduit 61 comprised of chain 62 (as seen in FIG. 6) reaches the bottom of the borehole, such a conduit 71 accumulates as a pile 73 of chain links in the bottom 72 of the borehole (similar to the accumulation of an anchor chain in a chain locker on a sailboat), as illustrated in FIG. 7. The liner 74 (liner 66 of FIG. 6) can evert onto the piled chain 73 without damage of the liner or tangling of the flexible conduit 71. An advantage of such an accumulation is that the chain is easily removed during the subsequent liner removal, by inversion, without kinking of the chain, and the conduit formed of chain and mesh rises into the inverting liner in the reverse of the installation. The surrounding mesh reduces any tendency of the chain links to kink. Such kinking is normally prevented by a cross bar in each link of an "anchor" type chain. Referring also to FIG. 6, the chain conduit features an added advantage, during liner removal by inversion, in that an open flow path 610 is assured, during liner removal, for water injection via the long tube 69. Further, there is less reliance on wrinkles in the liner providing a flow path past the everting end of the liner.

If a user of the present system and method has foreknowledge of the extent of a permeable interval of the borehole, such knowledge as may be obtained by the methods and systems of U.S. Pat. No. 6,910,374 ("Borehole Conductivity Profiler") and U.S. Pat. No. 7,281,422 ("Method for Borehole Conductivity Profiling"), the chain length can be predetermined and selected to assure easy water removal below that level of a permeable feature in the borehole. The lower-most permeable feature intersecting the borehole is the feature of principal interest in this regard.

The ability to install a flexible liner without the need for a pump tube normally greatly reduces the time required for a liner installation, because the liner does not need to be deflated and re-inflated after the pump tube removal. An added advantage of the chain conduit is that a flow path is assured from the port to the bottom of the everting liner when the liner is covered with a thin hydrophobic covering as described, for example, in U.S. Pat. No. 7,896,578 ("Mapping of Contaminants in Geologic Formations"). Experience has shown that the flexible covering can impede the flow from the port through the inverted liner, as shown in FIG. 3 without the conduit addition.

Figure 8:
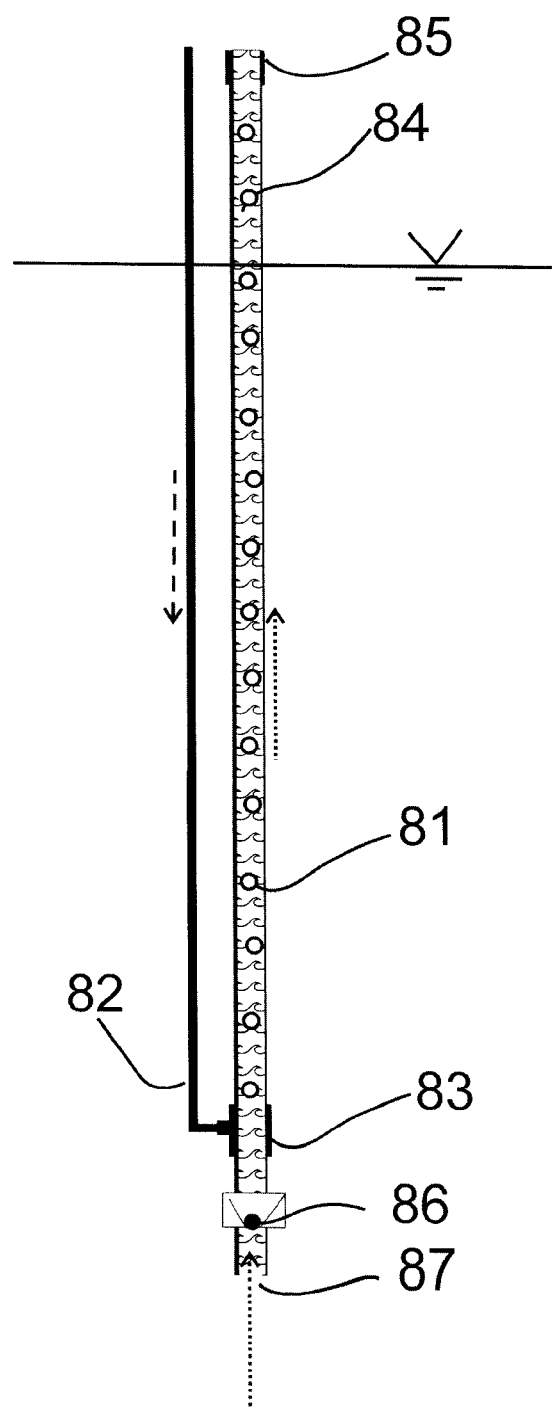
FIG. 8 is an enlarged vertical section view illustrating additional optional features of the long vent tube (as seen in FIGS. 2, 3 and 5) for beneficial use with deep water tables in a geologic formation.

In the situation where peristaltic pumping is insufficient for water removal during the installation of the liner by eversion, the long vent tube of FIG. 2 may be modified to provide a pumping capability by air-lift-pumping or by positive displacement pumping. FIG. 8 depicts schematically (in enlarged view, but not necessarily to scale within the figure) a substantial portion of the long vent tube 81 at some suitable elevation above the port (e.g., the port 52 on FIG. 5). A second, air injection, tube 82 is provided, extending from the surface and to a tee connector 83; the tee connector 83 is connected to both the air injection tube 82 and the vent tube, to place the air injection tube in fluid communication with the long vent tube 81. By injecting air from the surface down through the second tube 82 (dashed down-directional arrow in FIG. 8), the user can pump water upward in and from the long vent tube 81 by means of the common technique known as air lift pumping. (See upper dotted up-directional arrow in FIG. 8.) The air addition at the connector 83 reduces (by aeration) the density of the water column 84 in the long vent tube 81, causing the more dense water (i.e., water 513 in FIG. 5) beneath the liner to displace the less dense aerated water 84 out the top 85 of the long vent tube 81 at the surface.

A second alternative pumping option is to locate a check valve 86 above the port 87 and below the tee 83, as shown in FIG. 8. In this latter case, by injecting air under a suitable high pressure into the top 85 of the long vent tube 81 (which tube initially is filled with ambient water) the check valve 86 closes under the increased applied pressure. With the valve 86 held closed by the pressure in the vent tube 81, and with continued injection of pressurized air into the vent tube 81, the ambient water 84 in the long vent tube 81 is expelled via the tee connector 83 and upward out of the second tube 82 at the surface. The pressure of the injected air at the top 85 is then controllably decreased, and the vent tube 81 refills with water from beneath the liner, via the now-open check valve 86 (see lower dotted up-directional arrow in FIG. 8) in preparation for another pumping stroke. After the vent tube 81 has refilled, the injected air pressure is again increased to repeat the process of closing the valve 86 and expelling water from the vent tube 81 to the surface via the second tube 82. The foregoing process can be recycled as many times as desired to evacuate water from beneath the liner. It also is noted by one skilled in the art, referring to FIG. 8, that if a user of the system is to use the long vent tube 81 for water addition (i.e., during inversion of the liner upward in the borehole), the system generally cannot include a built-in operable check valve (e.g., 86) in the vent tube 81. But as an alternative, the user can practice the basic system and method to add/inject water without a check valve, and then later "convert" the system to a check-valved water pumped-extraction configuration. This may be realized by pre-defining some type of valve seat, e.g., providing a constriction, at the appropriate height location in the vent tube (above the vent tube liner port, where valve 86 is seen in FIG. 8), and then dropping a suitably sized (non-floating) ball down the tube 81, from its top 85, and allowing the ball to fall and movably rest in the valve seat.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it shall be intended to cover in the appended claims all such modifications and equivalents. The disclosures of all United States Letters Patent cited hereinabove are expressly incorporated herein by reference.

I claim:

1. A system for facilitating the installation or removal of a flexible liner into or from a subterranean borehole below the surface of the ground, comprising:
    a flexible liner evertable down the borehole, the liner having:
        a closed end; and
        an inverted portion adjacent the closed end;
    a port disposed through the liner near the closed end;
    a vent tube extending, within an interior of the liner, from the port to the surface;
    a tether extending from the closed end to the surface; and
    a pump means for moving water to or from the surface, via the port and vent tube, from or to the borehole beneath the inverted portion.

2. A method facilitating installation or removal of a flexible liner into or from a subterranean borehole below the surface of the ground, comprising:
    providing a liner with a closed end and an inverted portion adjacent the closed end;
    disposing a port through the liner near the closed end;
    extending a vent tube within an interior of the liner from the port to the surface;
    extending a tether from the closed end to the surface; and
    moving water to or from the surface, via the port and vent tube, from or to the borehole beneath the inverted portion.

3. The method of claim 2 further comprising everting the liner down the borehole while moving water, via the port and vent tube, to the surface from the borehole.

4. The method of claim 3 further comprising:
    defining an exterior pocket with the inverted portion of the liner;

supporting a flexible conduit within the pocket and below the port;
extending a bottom end of the flexible conduit into the borehole beneath the inverted portion; and
maintaining with the flexible conduit a flow path through the pocket from the borehole beneath the inverted portion of the liner and to the port.

5. The method of claim 4 wherein the step of moving water to the surface comprises pumping water from the pocket via the port.

6. The method of claim 4 wherein the step of supporting a flexible conduit comprises:
connecting a chain to the closed portion of the liner; and
covering the chain with a permeable flexible tubular mesh.

7. The method of claim 6 further comprising:
allowing the chain to reach a bottom of the borehole; and
while everting the liner, allowing the chain to accumulate in a pile on the bottom of the borehole.

8. The method of claim 3 wherein the step of everting the liner down the borehole while moving water to the surface comprises:
deploying at the surface a main reel having a hollow axle;
placing a pump in fluid communication with the hollow axle;
placing the vent tube in fluid communication with the hollow axle;
unwinding the tether and vent tube from the reel while pumping water to the surface via the vent tube and hollow axle.

9. The method of claim 5 wherein the step of pumping comprises peristaltic pumping.

10. The method of claim 5 wherein the step of pumping comprises air-lift-pumping, and further comprising:
placing a connector in the vent tube above the port;
extending an air injection tube from the surface and connected to the connector;
placing the air injection tube in fluid communication with the vent tube via the connector;
allowing the vent tube above the connector to at least partially fill with water from the port; and
injecting air through the injection tube to pump aerated water upward in the vent tube to the surface.

11. The method of claim 5 wherein the step of pumping comprises positive displacement pumping, and further comprising:
placing a connector in the vent tube above the port;
locating a check valve in the vent tube above the port and below the connector;
extending a second tube from the surface and connected to the connector;
placing the second tube in fluid communication with the vent tube via the connector;
allowing the vent tube above the check valve to at least partially fill with water from the port;
injecting air into a top of the vent tube to increase pressure in the vent tube, thereby closing the check valve;
expelling at the surface, via the connector and second tube, water in the vent tube.

12. The method of claim 2 further comprising inverting the liner up the borehole while moving water, via the port and vent tube, to the borehole from the surface.

13. The method of claim 12 further comprising:
defining an exterior pocket with the inverted portion of the liner;
supporting a flexible conduit within the pocket and below the port;
extending a bottom end of the flexible conduit into the borehole beneath the inverted portion; and
maintaining with the flexible conduit a flow path through the pocket from the port and to the borehole beneath the inverted portion of the liner.

14. The method of claim 12 wherein the step of moving water to the borehole comprises pumping water into the pocket via the port.

15. The method of claim 12 wherein the step of inverting the liner up the borehole while moving water to the borehole comprises:
deploying at the surface a main reel having a hollow axle;
placing a pump in fluid communication with the hollow axle;
placing the vent tube in fluid communication with the hollow axle;
winding the tether and vent tube onto the reel while pumping water from the surface via the hollow axle and vent tube.

16. A method facilitating installation removal of a flexible liner from a subterranean borehole below the surface of the ground, comprising:
providing a liner with a closed end and an inverted portion adjacent the closed end;
disposing a port through the liner near the closed end;
extending a vent tube within an interior of the liner from the port to the surface;
extending a tether from the closed end to the surface;
moving water from the surface, via the port and vent tube, to the borehole beneath the inverted portion; and
inverting the liner, with the tether, up the borehole while moving water to the borehole.

17. The method of claim 16 further comprising:
defining an exterior pocket with the inverted portion of the liner;
supporting a flexible conduit within the pocket and below the port;
extending a bottom end of the flexible conduit into the borehole beneath the inverted portion; and
maintaining with the flexible conduit a flow path through the pocket from the port and to the borehole beneath the inverted portion of the liner.

18. The method of claim 17 wherein the step of moving water to the borehole comprises pumping water into the pocket via the port.

19. The method of claim 17 wherein the step of inverting the liner up the borehole while moving water to the borehole comprises:
deploying at the surface a main reel having a hollow axle;
placing a pump in fluid communication with the hollow axle;
placing the vent tube in fluid communication with the hollow axle;
winding the tether and vent tube onto the reel while pumping water from the surface via the hollow axle and vent tube.

* * * * *